United States Patent Office 3,637,902
Patented Jan. 25, 1972

3,637,902
EPOXIDE RESINS CURED WITH AMINE-GLYCIDYL ESTER ADDUCTS IN ADMIXTURE WITH A PHENOLIC ACCELERATOR
Clifford F. Dukes, Jeffersontown, and George B. Scott, Louisville, Ky., assignors to Celanese Coatings Company, New York, N.Y.
No Drawing. Filed Aug. 26, 1969, Ser. No. 853,204
Int. Cl. C08g 45/06
U.S. Cl. 260—830 TW   8 Claims

ABSTRACT OF THE DISCLOSURE

Room temperature curable compositions useful in coatings, floor topping, moldings, encapsulations and other plastics applications are prepared from a blend of an epoxide resin, an amine-glycidyl ester adduct and a phenolic accelerator.

BACKGROUND OF THE INVENTION

The field of art to which this invention pertains is thermosetting resins, particularly room temperature curable poyepoxide resins.

The reaction of epoxide resins with aliphatic polyamines to form cured products is well known and is described in such publications as "Epoxy Resins" by Lee and Neville, McGraw-Hill Book Company, Inc., New York (1957). Even though aliphatic polyamines are widely used as epoxide resin curing agents, there are some inherent disadvantages in their usage. Castings and coatings made from epoxide resins and aliphatic polyamines, particularly when cured at room temperature and under atmospheric conditions, often have greasy uneven surfaces. Such surface conditions are caused by the reactivity of the amines to atmospheric moisture and carbon dioxide. Amine carbonates form at the surface and these hygroscopic salts absorb moisture from the atmosphere, presenting a wet appearance. This surface phenomenon is often described as being an exudation of the amine to the surface and has been termed "sweat-out," "blush" or "bloom." This condition is undesirable not only aesthetically but also functionally in that intercoat and interlaminar adhesion is impaired.

Likewise, the reaction of aliphatic polyamines with mono epoxides to form modified epoxy resin curing agents is well known in the art. However, these reaction products have generally poor flexibility and tend to crater when applied in a thin film. Finally, these previously described polyamine-epoxide adducts offer little improvement over normal polyamine curing agents with regard to amine carbonate formation.

Amine carbonate formation has been controlled by the use of aryl sulfonamide-aldehyde adducts as polyamine-epoxy accelerators. However, these adducts are often heavy and difficult to handle, especially at room temperature.

SUMMARY OF THE INVENTION

This invention relates to the co-reaction of epoxide resins with aliphatic polyamine adducts and phenolic accelerators and to the crosslinked infusible, insoluble products resulting therefrom. In particular, this invention pertains to carrying out the above reaction to produce cured compositions having improved physical and surface properties.

This invention is directed to room temperature curable compositions made from an epoxide compound having more than one 1,2 epoxide groups per molecule, an amine glycidyl ester adduct and a phenolic accelerator. The amine glycidyl ester adduct is a reaction product of about 0.5 to about 0.9 mols of a glycidyl ester having the general formula:

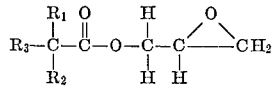

and about 1.0 mol of an amine of the general formula:

$$H_2N-R_4-NH_2$$

In the above formulae $R_1$, $R_2$ and $R_3$ collectively have 5 to 15 carbon atoms and $R_4$ has 5 to 10 carbon atoms. The phenolic accelerator is added in the ratio of about 0.55 to 1.0 phenolic OH equivalent of accelerator for each primary amine equivalent of the amine-glycidyl ester adduct. About 40 to about 100 parts of amine-glycidyl ester adduct and phenolic accelerator are blended with about 100 parts of the polyepoxide resin to make up the total composition of this invention.

The use of the amine-glycidyl ester alone in admixture with the epoxide resins hereinafter described fails to produce the "sweat-out" or "bloom" free properties which are desired. However, when the above amounts of phenolic accelerator are added to the epoxy amine glycidyl ester adduct, "bloom" is substantially reduced or eliminated.

It is thought that the above described mixture of the phenolic accelerator and the amine-glycidyl ester adduct acts to reduce amine carbonate formation by reducing the amount of primary amine which is left unreacted after curing of the polyepoxide resin. A portion of the primary amine groups of the aliphatic diamine which is used herein is reacted with the glycidyl ester as below to form 2° amine alcohols.

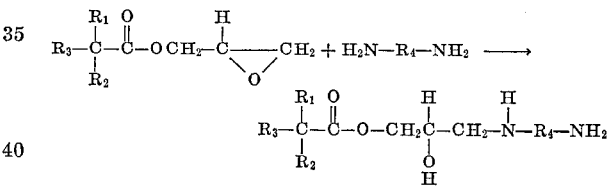

Similarly it is thought that the reaction of the above product with the phenolic accelerator further eliminates the presence of primary amine groups by the formation of a phenolic salt, or phenolic primary amine complexes. These above reaction products are not sensitive to atmospheric moisture or carbon dioxide, and as a result the surfaces of coatings and castings made from cured blends of epoxide resins and these reaction products are improved by minimizing or preventing "sweat-out," "bloom," or "blush" formation. The explanation as stated above is merely theoretical and is included in an attempt to more fully explain the compositions herein described. This discussion is not included as a limitation on these compositions.

The compositions of this invention are useful in seamless flooring applications, tile-like coatings, plastic tooling, laminates and in general purpose room temperature usage. These compositions can also be used in moldings and encapsulation applications where elevated temperatures are normally used to achieve complete cure.

DESCRIPTION OF THE INVENTION

The epoxide resins useful in this invention are epoxide resins which contain more than one 1,2-epoxide group per molecule and no other groups reactive with amines. They can be saturated or unsautrated, aliphatic, cycloaliphatic, aromatic or heterocyclic and can be monomeric or polymeric in nature.

Useful epoxide resins include glycidyl ethers of polyhydric phenols obtained by reacting a polyhydric phenol in an excess of epichlorohydrin with sodium hydroxide. Such polyhydric phenols include bisphenol A (p,p'-dihydroxydiphenyl propane), resorcinol, hydroquinone, 4,4'-dihydroxybenzophenone, bis(4-hydroxyphenyl) ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting 1.1 up to about 2 mols of epichlorohydrin with 1 mol of dihydric phenol or by reacting diepoxides with added dihydric phenols.

Additional epoxide resins are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanetriol, pentaerythritol, trimethylol ethane and trimethylol propane.

Still other epoxide resins include glycidyl esters of polycarboxylic acids, such acids being azelaic acid, adipic acid, isophthalic acid, terephthalic acid, dimerized and trimerized unsaturated fatty acids, etc.

The epoxide resins also include epoxidized hydrocarbons such as vinyl cyclohexene dioxide, butadiene dioxide, dicyclopentadiene dioxide, epoxidized polybutadiene and limonene dioxide. Other epoxide resins are epoxidized esters, for example, epoxidized soybean oil, epoxidized glycerol trilinoleate, and 3,4-epoxy-cyclohexylmethyl-3,4-epoxy-cyclohexane carboxylate. Still other epoxides are polymers and copolymers of vinyl polymerizable monoepoxides, such monoepoxides being allyl glycidyl ether, glycidyl acrylate and glycidyl methacrylate.

The preferred epoxide resins are the glycidyl polyethers of polyhydric phenols and polyhydric alcohols, particularly the glycidyl polyether of p,p'-dihydroxydiphenyl propane or bisphenol A as it is commonly named.

Most preferred among the epoxide resins is a mixture of epoxide resins, one portion being derived from a polyhydric alcohol and the other portion being derived from a polyhydric phenol.

The glycidyl esters as used in this invention can be described by the general formula:

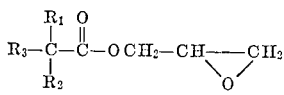

In this formula $R_1$, $R_2$, and $R_3$ collectively have 5 to 15 carbon atoms. Preparation of esters similar to this is described in U.S. Patent No. 3,178,454. When $R_1$, $R_2$, and $R_3$ consist of more than 15 carbon atoms the resulting films or castings are soft and subject to solvent attack. Conversely, when $R_1$, $R_2$, and $R_3$ are of less than 5 carbon atoms films tend to be brittle and unresilient. Preferred are those glycidyl esters wherein $R_1$, $R_2$, and $R_3$ have from 7 to 9 carbon atoms. The use of the tertiary carbon type ester as illustrated above has several advantages over normal straight chain ethers or esters. In the first place as a glycidyl ester rather than ether the resins prepared are more resistant to attack from sunlight or ultra violet light. Secondly, as a tertiary ester, alkaline hydrolysis is made more difficult. Finally, as a branched rather than srtaight chained molecule more carbon atoms are packed into each unit area producing tougher castings and films.

Coreacted with this glycidyl ester is an aliphatic poly amine of the general formula:

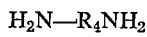

$R_4$ can contain from 5 to 10 carbon atoms. Included among the amines described by this formula are the various branched and straight chained pentyl, hexyl, heptyl, octyl, nonyl, and decyl amines. When the amine carbon content is decreased below 5 carbon atoms film or casting flexibility decreases and the viscosity of the reacted amine-glycidyl ester adduct increases above 2000 cps.

It is preferable that the viscosity of the amine-glycidyl ester adduct should be less than about 2000 cps. More viscous adducts are difficult to handle at room temperature and in many cases it is impossible to achieve completely compatible blends when these higher viscosity adducts are mixed with epoxide resins. On the other hand when the carbon chain length is increased above 10 carbon atoms the films or castings become too soft and are subject to marring and scratching. Preferred among the above amines are the $C_6$ and $C_7$ carbon diamines, especially 1,6-diaminohexane (hexamethylene diamine). Also of use, however, is trimethyl hexamethylene diamine.

In preparing the amine-glycidyl ester adducts of this invention from about 0.5 to 0.9 mols of the selected glycidyl ester are reacted with each mol of the selected amine. When more than about 0.9 mols of glycidyl ester are used the adduct viscosity increases above the preferred 2000 cps. viscosity level. However, when the glycidyl ester content is reduced below about 0.5 mol level and cured, epoxy blend tends to form amine carbonates. Preferred are those adducts formed by reacting from about 0.7 to 0.8 mols of the glycidyl ester with each mol of amine.

Preparation of these amine-glycidyl ester adducts is accomplished by heating the desired amine to about 150° F. to 250° F. The heat source usually then can be removed and the particular glycidyl ester added at a rate which maintains the reaction temperature in the 150° F. to 250° F. range. Since the amine glycidyl ester reaction is exothermic the addition of the glycidyl ester to the amine mixture usually produces enough heat to maintain this reaction temperature. When all of the glycidyl ester has been added, the reactants are held at reaction temperature for an additional few minutes to assure complete amine-epoxide condensation. When products are prepared according to these methods they can be cooled to room temperature and will in most cases remain as free flowing liquids.

The final major constituent of the composition of this invention is a phenolic accelerator. This accelerator can have from 6 to 18 carbon atoms per molecule and can be mono, di, or tri functional in phenolic groups. Included among these phenolic accelerators are phenol, the nitro phenols, the chlorophenols, the nonyl phenols, para-tertiary butyl phenol, the resorcinols, the cresols, the salicylic acids and the various bisphenols. These accelerators can be present either singly or in admixture. Preferred among the above phenolic accelerators are phenol, para-tertiary butyl phenol and bisphenol A (p,p'-dihydroxy diphenyl propane).

These accelerators are added in the ratio of about 0.55 to 1.0 phenolic —OH equivalents for each primary amine equivalent of the above described amine-glycidyl ester adduct. For example when ½ mol of the glycidyl ester as described above has been reacted with 1 mol of a di primary amine, there are 1½ equivalents of primary amine left in this adduct after the amine-glycidyl ester adduction reaction has been carried out. Preferred as the ratio of phenolic —OH equivalent to primary amine equivalents is about 0.6 to 0.8 equivalent of phenolic —OH for each primary amine equivalent.

The compositions of this invention are prepared by blending from 40 to 100 parts by weight of the total weight of phenolic accelerator and amine-glycidyl ester adduct with about 100 parts of the epoxy compound.

The order in which the components of this invention are mixed is in most cases immaterial. In other words the accelerator can be added to amine-glycidyl ester adduct and this mixture then added to the epoxide compound, or the adduct can be added to the epoxide compound followed by the addition of the accelerator. However, where the particular phenolic accelerator is solid at room temperature, the preferred procedure is to mix the phenolic accelerator with the amine-glycidyl ester adduct at slightly elevated temperature until a homogeneous solution is obtained.

Likewise when longer pot life is required it is also desirable to add accelerators which are liquid at room temperature to the amine-glycidyl ester adduct before blending with the epoxide resin. If this is not done the separate additions of adduct and accelerator to the epoxide compound can lead to a very high exotherm temperature and a correspondingly shorter pot life.

In cases where the amine-glycidyl ester adduct has a viscosity at 25° C. of higher than about 1000 cps., it is desirable to add to this adduct any of the commonly used epoxy curing agent diluents. Typically these diluents can be added in amounts equal to about 5 to 40 percent by weight of the total composition, i.e., epoxide compound plus amine-glycidyl ester adduct plus phenolic accelerator. Preferred among these common diluents are diethyl amino ethanol and N,N-dimethyl caproamide.

Additional dilution and flexibilization can be accomplished by the addition of various long chained diamines with molecular weights of at least 200. Preferred among the long chained diamines are the polyoxyalkylene diamines. An example of this type of additive is a polypropylene oxide derived additive terminated at either end with a primary amine group. This compound commonly called polyoxypropylene diamine 400, has the general formula:

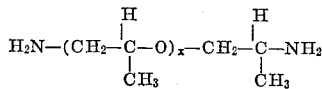

and an average molecular weight of about 400. Other similar higher or lower molecular weight additives can also be utilized. In addition high molecular weight diamines derived from polyethylene oxide, polybutylene oxide and other aliphatic polyoxides are of use. When present any of these additives preferably should be added in an amount equal to from about 2 to about 10 weight percent of the total composition (epoxide resin plus glycidyl ester-amine adduct plus phenolic accelerator).

Where added toughness is desired small amounts of various polyalkylene amines can be added to the compositions of this invention. Typical of these amines are ethylene diamine, diethylene triamine, triethylene tetramine, and tetraethylene pentamine. These amines can be blended with the previously described glycidyl ester-amine adducts in amounts varying from 0.1 to 4.0 weight percent based upon the total glycidyl ester-amine adduct concentration. Preferred among the polyalkylene amines is tetraethylene pentamine.

Other materials can also be included with the compositions of this invention depending upon their intended end use. These other materials include fillers, such as asbestos, aluminum oxide, sand, etc., pigments, dyes, plasticizers, reactive diluents and the like. When used for surface coatings, these compositions can be dissolved in solvents, such as aromatic hydrocarbons, ketones, esters, alcohol, ether-alcohols and ether-esters.

Although the compositions of this invention find particular utility when cured at room temperature, their usage is not limited to low temperature cures. They can be cured over a wide range of temperatures from about 15° C. to about 200° C.

The compositions of this invention can be used in preparing 100% solids tile-like coatings or in solvent thinned maintenance and marine coatings. They can also be used as adhesives and in laminates, plastic tooling and the like.

The following examples illustrate the invention described herein. Unless otherwise specified, all parts and percentages are by weight.

Example I

Into a three necked reaction flask equipped with a mechanical agitator, addition funnel, reflux condenser, and thermometer were added 1624 parts of hexamethylene diamine (HMDA). This amine was heated to about 200° F. and 2576 parts of a glycidyl ester having the formula:

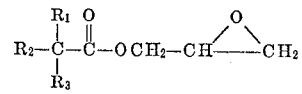

were added over 3 hours and 15 minutes at 200° F. In the above glycidyl ester $R_1$, $R_2$ and $R_3$ together have from 7–9 carbon atoms. The ester itself has a molecular formula of $C_{12-14}H_{22-26}O_3$, an epoxide equivalent weight of 240–250, a melting point of below −60° C., a density of 0.972 g./ml. and a 25° C. viscosity of 7–8 cps. After all of this glycidyl ester had been added the reaction mixture was held at 200° F. for 30 minutes and then cooled to room temperature.

Example II

Using the same procedure as in Example I, 736 parts of the above glycidyl ester were added to 464 parts of HMDA at 200–220° F. over 50 minutes. Holding this reaction mixture for 30 additional minutes at 203° F. produced an epoxy amine adduct having a Garner-Holdt (25° C.) viscosity of P, a weight/gal. of 7.82 lbs. and a Gardner color of 4–5.

Example III

Into a suitable container equipped with a mechanical agitator were mixed 56.58 parts of Example I, and 6.28 parts of a diamine terminated polypropylene oxide copolymer having an approximate molecular weight of 400. This mixture was heated to 200° F. and 12.14 parts of bisphenol A and 10.0 parts of phenol were added. After about 5 minutes this mixture became homogenous and was then cooled to room temperature and mixed with 5.0 parts of N,N-dimethylcaproamide and 10.0 parts of diethyl amino ethanol.

Example IV

Using the same procedure as in Example III, an epoxy curing agent was prepared similar to Example III, except that the 10.0 parts of diethyl amino ethanol were replaced with N,N'-dimethyl caproamide giving the blend a total of 15.0 parts of N,N-dimethylcaproamide.

Example V 169.8 parts of Example II, 4.1 parts tetraethylene pentamine and 29.7 parts of bisphenol A were heated to 200° F. and held until a homogeneous mixture was formed.

Example VI

A room temperature blend was prepared using 31.05 parts of Example II, 13.05 parts of phenol, 0.9 part of tetraethylene pentamine and 5.0 parts of N,N-dimethylcaproamide. This blend exhibited a Gardner-Holdt (25° C.) viscosity of R.

Example VII

A room temperature blend of 36.5 parts of Example I, 7.6 parts of phenol, 0.9 part of tetraethylene pentamine and 5.0 parts of N,N-dimethylcaproamide was prepared having a Gardner-Holdt (25° C.) viscosity of M–N.

Example VIII–X

The following blends were prepared and films were cast on glass using a 5 mil draw down blade:

| Example | Parts of diglycidyl ether of bisphenol A [1] | Parts of Example No. | Amount |
|---|---|---|---|
| VIII | 25.00 | V | 20.54 |
| IX | 50.00 | VI | 26.00 |
| X | 50.00 | VII | 24.60 |

[1] Having a weight per epoxide of about 190.

The above examples were allowed to cure overnight at room temperature and then were evaluated.

Example VIII represents a blend of an epoxide compound with a glycidyl ester-amine adduct which has been prepared by reacting 0.75 mol of the above described glycidyl ester with each mol of HMDA. This blend was accelerated with bisphenol A. The resulting film exhibited no amine carbonate formation and was not brittle.

Example IX is similar to Example VIII except that a minor amount of tetraethylene pentamine was added to increase cure response and bisphenol A was replaced with one equivalent of phenol for each equivalent of primary amine present in the preformed glycidyl ester-amine adduct. Films prepared from this example were tough, clear and had generally good appearance.

Example X is similar to Example IX except that only 0.5 equivalent of phenol were added for each primary amine equivalent in the preformed glycidyl ester-amine adduct. The resulting films, although tougher than those prepared in Example IX, exhibited extreme amine carbonate formation.

Examples XI–XIV

In the following examples, Epoxy A is a diglycidyl ether of p,p'-dihydroxy diphenyl propane having an epoxide equivalent weight of 190–200. Epoxy B is a triglycidyl ether of trimethyol ethane having an epoxide equivalent weight of about 160.

| Example | XI | XII | XIII | XIV |
|---|---|---|---|---|
| Composition (parts by weight): | | | | |
| Epoxy A | 85 | 85 | 85 | 85 |
| Epoxy B | 15 | 15 | 15 | 15 |
| Example III | 66 | | | |
| Example IV | | 60 | 66 | 71 |
| Working properties at 77° F.: | | | | |
| Viscosity (cps.) | | | 4,000 | |
| Gel time (100 gms.) min | 27 | 27 | 25 | 23 |
| Film properties (2.5 mils cured 3 days at 77° F.): | | | | |
| Mar resistance | Good | Good | Good | Good |
| Toughness | Short | do | do | Do. |
| Clarity | Good | do | do | Do. |
| Sweat-out | None | None | None | None |
| Physical properties at 77° F. (cure schedule: 2 wks. at 77° F.): | | | | |
| Tensile strength (p.s.i.) | 8,290 | 2,350 | 2,230 | 2,210 |
| Tensile elongation, percent | 2.5 | 53 | 51 | 62 |
| Flexural strength (p.s.i.) | 12,700 | 2,900 | 2,000 | 1,150 |
| Flexural modulus (p.s.i.) | .35×10⁶ | .08×10⁶ | .04×10⁶ | .03×10⁶ |
| Ultimate compressive strength (p.s.i.) | 19,070 | 32,330 | 30,020 | 3,090 |
| Compressive yield str. (p.s.i.) | 12,530 | 4,330 | 4,220 | |
| Hardness (Shore D) | 82 | 78 | 75 | 73 |
| Izod impact (ft. lbs./in. notch) | .37 | .70 | .83 | 1.37 |
| 24-hour absorption (%) in: | | | | |
| Water | .43 | .34 | .36 | .34 |
| 5% acetic acid | 9.7 | 1.5 | 1.55 | 1.7 |
| Solvent (1) | 12.3 | 7.9 | 8.8 | 9.3 |

¹ 50/50 xylene isopropanol.

It is to be understood that the foregoing detailed description is given merely by way of illustration and that many variations can be made therein without departing from the spirit of the invention.

We claim:
1. A room temperature curable composition, comprising:
   (a) an epoxide compound containing more than one 1,2 epoxide group per molecule;
   (b) an amine-glycidyl ester adduct which is a reaction product of
      (i) about 0.5 to about 0.9 mol of a glycidyl ester having the general formula:

$$R_3-\underset{\underset{R_2}{|}}{\overset{\overset{R_1}{|}}{C}}-\overset{O}{\overset{||}{C}}-O-\underset{\underset{H}{|}}{\overset{\overset{H}{|}}{C}}-\underset{H}{\overset{H}{C}}-CH_2 \diagdown O \diagup$$

wherein $R_1$, $R_2$, and $R_3$ are each substituted alkyl groups and collectively have 5 to 15 carbon atoms and
      (ii) about 1.0 mol of an aliphatic amine of the general formula:

$$\underset{\underset{H}{|}}{\overset{\overset{H}{|}}{N}}-R_4-\underset{\underset{H}{|}}{\overset{\overset{H}{|}}{N}}$$

wherein $R_4$ has from 5 to 10 carbon atoms; and
   (c) a phenolic accelerator having from 6 to 18 carbon atoms per molecule wherein the ratio of the phenolic —OH equivalents of (c) to the equivalents of primary amine of (b) is from 0.55 to about 1.0:1.0 and wherein about 40 to 100 parts of (b) and (c) taken together are blended with about 100 parts of (a).

2. The composition of claim 1 wherein the epoxide compound comprises a mixture of glycidyl polyethers of polyhydric phenols and polyhydric alcohols.

3. The composition of claim 1 wherein the amine is hexamethylene diamine.

4. The composition of claim 1 wherein the phenolic accelerator is selected from phenol, para-tertiary butyl phenol, bisphenol A or mixtures thereof.

5. The composition of claim 1 where (i) and (ii) are reacted in the molar ratio of about 0.7 to 0.8 mols of (i) to about 1.0 mol of (ii); and wherein the ratio of equivalents of accelerator (c) to the equivalents of primary amine of (b) is about 0.6 to 0.8 of (c) to 1.0 of (b).

6. The composition of claim 1 wherein about 5 to about 40 weight percent of a diluent is added based upon the total weight of (a)+(b)+(c).

7. The composition of claim 1 in admixture with about 2 to 10 weight percent based on the total weight of (a)+(b)+(c) of a long chained diamine having a molecular weight of at least 200.

8. The composition of claim 1 in admixture with about 0.1 to about 4.0 weight percent based on the weight of the amine-glycidyl ester adduct of a polyalkylene amine.

References Cited

UNITED STATES PATENTS 2,864,775   12/1958   Newey _____ 260—47 X

OTHER REFERENCES

Handbook of Epoxy Resins, by Lee et al., 1967 (pp. 16–9 relied on).

WILLIAM H. SHORT, Primary Examiner

T. E. PERTILLA, Assistant Examiner

U.S. Cl. X.R.

117—161 ZB; 161—184; 260—2 EC, 18 Ep, 32.6 R, 37 Ep, 47 EC, 59, 88.3 A, 78.4 Ep, 94.2